(12) United States Patent
Qubti et al.

(10) Patent No.: US 7,302,436 B2
(45) Date of Patent: Nov. 27, 2007

(54) BUSINESS WORKFLOW DATABASE AND USER SYSTEM

(75) Inventors: Marwan Qubti, Taylors, SC (US); Manfred Moser, Greer, SC (US)

(73) Assignee: Bayerische Motoren Werke Aktiengesellschaft (DE)

( * ) Notice: Subject to any disclaimer, the term of this patent is extended or adjusted under 35 U.S.C. 154(b) by 534 days.

(21) Appl. No.: 10/676,000

(22) Filed: Oct. 2, 2003

(65) Prior Publication Data

US 2005/0076049 A1  Apr. 7, 2005

(51) Int. Cl.
*G06F 17/30* (2006.01)
(52) U.S. Cl. .................... 707/100; 707/101; 707/104.1
(58) Field of Classification Search ...................... None
See application file for complete search history.

(56) References Cited

U.S. PATENT DOCUMENTS

| | | | |
|---|---|---|---|
| 5,960,404 A * | 9/1999 | Chaar et al. .................... 705/8 |
| 5,983,194 A | 11/1999 | Hogge et al. | |
| 6,138,104 A | 10/2000 | Marchak et al. | |
| 6,539,404 B1 | 3/2003 | Ouchi | |
| 6,678,698 B2 * | 1/2004 | Fredell et al. ........... 707/104.1 |
| 7,051,036 B2 * | 5/2006 | Rosnow et al. ............. 707/102 |
| 2001/0047326 A1 * | 11/2001 | Broadbent et al. ............ 705/38 |
| 2003/0097273 A1 * | 5/2003 | Carpenter et al. ............. 705/1 |
| 2003/0225607 A1 * | 12/2003 | Kopunovic et al. ............ 705/9 |
| 2004/0230594 A1 * | 11/2004 | Flam et al. ................. 707/100 |
| 2005/0086356 A1 * | 4/2005 | Shah et al. ................. 709/231 |
| 2005/0197952 A1 * | 9/2005 | Shea et al. .................... 705/38 |

\* cited by examiner

*Primary Examiner*—Abel-Jalil Neveen
(74) *Attorney, Agent, or Firm*—Davidson Berquist Jackson & Gowdey LLP

(57) ABSTRACT

A work flow system is described in which an originator of a task creates a new task description via a standard graphical user interface. The standard graphical user interface includes information regarding the task, together with a responsible entity for performing a task. An automatic email notification system notifies the responsible entity, whose leader accepts, rejects, or modifies a task, as necessary. Thereupon, the task report for the assigned/rejected/approved/modified item is automatically email reported to the originator and to anyone to whom the task has been assigned. The life cycle of the task is a complete loop such that the originator of the task is the only entity permitted to close the task, and must mandatorily do so for the task to be closed by the data base.

16 Claims, 12 Drawing Sheets

New LOP Item

Use this form to create a new LOP item.

6-FEB-2003 — 23
Current Date

Qubti, Marwan — 24
Originator

E53 — 25
Model

BIW MFG Line II — 26
Originating Group

[ ] — 27
Due Date

Underbody — 28
Originating Subgroup

SAMPLE - NEW LOP ITEM

Description — 29

Medium — 30
Priority

BIW Planning — 31
Responsible Group

CoC Methods & Standards — 32
Responsible Subgroup

Help

Submit Reset — 33

*Choose A Date*
February 2003
Su Mo Tu We Th F Sa
                    1  8
 2  3  4  5  6  7 14 15
 9 10 11 12 13 20 21 22
16 17 18 19 26 27 28
23 24 25

22 — (form)
20 — (arrow)

Submitted LOP Information — 21

Please retain a copy of this information for your records.
The LOP Tracking Number below has been assigned to your LOP submission.

LOP Tracking Number: 6013
Date Submitted: 2/6/2003 10:27:47 AM
Due Date: 2/7/2003
Responsible Group: BIW Planning
Responsible Sub Group: CoC Methods & Standards
Model: E53
Originator: Qubti, Marwan
Originating Group: BIW MFG Line II
Originating Sub Group: Underbody
Priority: Medium LOP Description:
SAMPLE - NEW LOP ITEM

FIGURE 2

LOP Item Transfer

Enter the LOP Item tracking number to transfer.

| Tracking Number | Date Initiated | Due Date |
|---|---|---|
| 6013 | 2/6/2003 10:27:47 AM | 2/7/2003 |
| Model | Originator — 45 | Originating Group — 47 | Orig. Sub Group — 48 |
| E53 | Qubti, Marwan | BMW MFG Line II | Underbody |
| Description | | | |
| SAMPLE - NEW LOP ITEM | | | |
| Priority | | Responsible Group | Resp. Sub Group |
| Medium | | BMW Planning | CoC Methods & Standards |

Enter transfer information below for LOP Item number: 6013

Transfer To Responsible Group:   Responsible Sub Group:

Activity

[Submit]

81 { LOP Delegate
Delegate to another person:

82 — Responsible Associate       Delegate Associate — 83

84 — From Date [Calendar]        Until Date [Calendar] — 85

[Submit] — 86

FIGURE 5

LOP Item Search  {91}

Search for LOP items in two ways:

Search by LOP tracking number.  [Search] ←92

Search by information about the LOP items.

| | |
|---|---|
| Model: | [All] ←93 |
| Originator: | [All] |
| Originating Group: | [All] ←94 |
| Responsible Group: | [All] ←95, 96 |
| Current Priority: | [All] ←97 |
| Current Status: | [In Progress] ←98 |
| Due By: | [10-FEB-2003] ←99 |
| Assigned To: | [All] ←100 |
| Keywords: | [  ]  * |

* Enter the exact string or multiple keywords separated by the '+' sign (e.g. logic+doorstation) ←101

[Search]

Originating Sub Group: [All] ←102
Responsible Sub Group: [All] ←103

→ 104

LOP Item Number 6013 Description  {107}

Original LOP Item Information

| Tracking Number | Date Initiated | Due Date |
|---|---|---|
| 6013 | 2/6/2003 10:27:47 AM | 2/7/2003 |
| Model | Originator | Originating Group | Orig. Sub Group |
| E53 | Qubti, Marwan | BMW MFG Line 1 | Underbody |
| Description | | | |
| SAMPLE - NEW LOP ITEM | | | |
| Priority | Status | Responsible Group | Resp. Sub Group |
| Medium | In Progress | BW Planning | CoC Methods & Standards |

Modified LOP Item Information  {108}

| Modification Date | | | |
|---|---|---|---|
| 2/6/2003 12:45:03 PM | | | |
| Modified Status | Assigned To | Modified Due Date | Modified Priority |
| In Progress | Qubti, Marwan | 2/7/2003 | Medium |
| Preparation | | | |
| INVESTIGATE AND ADDRESS PROPERLY | | | |
| Activity | | | |
| No Change | | | |

← 106

Sample – Detail of 1 LOP item ← 109

↗ 105

| LOP Tracking # | Assigned To | Originator | Orig. Due Date | Model |
|---|---|---|---|---|
| Date Originated | Resp. Group | Orig. Group | Modified Due Date | Priority / Status |
| 4717 5/20/2002 | Allen, Bill LOP Admin | Dawkins, Howard BW E53 Facelift | 5/24/2002 6/17/2002 | All air cleaners in Zone 3 of the bodyshop need to be serviced. We have a lot of problems with them ... | E53 Medium / Closed |
| 4733 5/29/2002 | Qubti, Marwan LOP Admin | Adams, Herman BMW Planning | 7/17/2002 7/17/2002 | The LOP approval and assignment procedure needs to be reviewed. New LOP's should be reviewed by a gr... | E53 High / Closed |
| 5585 9/25/2002 | Claessens, PeterSimmons, Timothy LOP Admin | LOP Admin | 9/30/2002 9/30/2002 | I can't select the month or the year for the due date for this new item, nor can I select the month ... | E53 High / Closed |

"Description displayed is limited to 100 Characters. For details, please use Search by LOP number option. When printing, make sure your select Landscape format.  ←111

*Sample – LOP ADHERENCE Report*

In Progress / Past Due LOP Items

| | |
|---|---|
| Model: | All |
| Originating Group: | All |
| Responsible Group: | BIW Planning |
| Responsible SubGroup: | CoC Process Planning |
| Current Priority: | All |
| Assigned To: | All |
| For help on LOP Aherence calculation details | Help |

- 121 → Model
- 122 → Originating Group
- 123 → Responsible Group
- 124 → Responsible SubGroup
- 125 → Current Priority
- 126 → Assigned To
- 127 → Help

| Responsible Group | On Time | 0-1 Week Overdue | 1-2 Weeks Overdue | 2-3 Weeks Overdue | 3+ Weeks Overdue | Closed Items | Non Adherence |
|---|---|---|---|---|---|---|---|
| BIW Planning / CoC Process Planning | 85 | 5 | 19 | 2 | 4 | 1200 | |
| Total | 85 | 5 | 19 | 2 | 4 | 1200 | |

128 { rows }  129 130 131 132  133 134

Summary

| | | |
|---|---|---|
| Not Assigned: | 0 | 0.00% |
| In Progress: | 115 | 7.31% |
| Complete / Closed: | 1200 | 76.24% |
| Rejected: | 178 | 11.31% |
| Transferred: | 81 | 5.15% |
| Total LOP Items: | 1574 | 100.00% |

Administration Screen ← 169

Welcome Marwan Qubti.

You may access the following administration tools.

Administration

Add, Modify, Delete Associate Account Information.

Add, Remove Lead Coordinators.

Reporting

Overview LOP users.

Overview Lead Coordinators.

---

171 { Add, Modify, Delete Associate Information ← 170
Use this form to add, modify or delete a user account.

Associate [     ▼] [Search] [Refresh]
                    172    173

Only enter fields to be modified, blank fields will be defaulted to original data.

Original    Modified

174 { Associate*
    NT Logon
    Email
    Address

175 { [Add] [Modify] [Delete]

FIGURE 9

# BUSINESS WORKFLOW DATABASE AND USER SYSTEM

FIELD OF THE INVENTION

This invention relates to business workflow systems, and particularly to databases and user interfaces associated with business workflow systems.

BACKGROUND OF THE INVENTION

Monitoring task progression and completion within a corporate environment is complex. Frequently, within those environments, one will find that supervisors have created spreadsheets, project lists or other informal tracking systems to monitor the tasks assigned by and to the supervisor. When perhaps hundreds of tasks are assigned, it is difficult to keep a tab on the tasks and their status, to remember when and whether a task has been completed, and to review whether the task has been completed to the satisfaction of the issuer.

Computerized business workflow systems are known for providing scheduling and analysis of workflow. Such systems allow a supervisor to graphically view tasks, work projections, loading, and scheduling in a single format. The programs typically require vigilance on the part of the supervisor to ensure that tasks are active until completion and, when completed, completed to satisfaction. Prior systems do not give a combination of both simple, intuitive notification to the originator and workers when tasks are assigned, modified or completed, together with an action requirement that the originator, and only the originator (or a proxy for the originator) affirmatively close the loop on a workflow item before the system actually closes the item.

Ouchi (U.S. Pat. No. 6,539,404) describes a workflow system for processing a document, and adds that an over-the-counter email system within in the workflow can be used to notify others when tasks associated with the document processing are performed. The same email system can be used for notification of the occurrence of tasks by others. Ouchi does not disclose that the workflow system have an affirmative requirement by the document originator to complete a document review loop before the loop is closed by the system. Thus, a document review loop may be closed without requiring the originator to affirmatively close it. Notifying the originator of completion does not give the originator control over whether the item has been completed to the satisfaction of the originator before the item leaves the email distribution. Further, without an affirmative closure by the originator (effectively certifying that the item is finished to satisfaction), any reporting information regarding the efficiency or effectiveness of the workers is suspect.

Cherneff et al (U.S. Pat. No. 6,233,493) describes a computer implemented product development planning tool, specifically modeling techniques for the manufacturing of products and product components (as opposed to, for example, the document review process of Ouchi). FIG. 7, for example, illustrates a task progress view which lists the various tasks needed to be done for the completion of a particular assignment. Start times, finish times, durations and variances can be recorded and charted for purposes of efficiency evaluation. The technique described facilitates task modeling and scheduling. Cherneff shows various reporting techniques for task completion, but does not describe how the sources of the tasks, nor those responsible for the tasks interact in a constructive way with each other as the tasks are assigned, worked, and reported, except to record in the task tables, their necessity and their details associated with their occurrence (such as duration, etc.). Further, because the workflow does not have a mandatory return to an originator for closure, the reports of efficiency and effectiveness are suspect. For example, workers who "close" a task upon completion may be credited in the system for "completion," "timeliness," or other status that is more complimentary than the reality. As a result, reports reflective of performance are skewed by the information.

Marchak et al (U.S. Pat. No. 6,138,104) describes constructive interaction between various entities in a workflow. It describes a product development system that provides graphical user interfaces for reporting tasks, and their completion, and adds a work management tool where individual tasks are defined in terms of a sequence of life-cycle stages, where each stage defines the roles responsible for planning, doing, administering, and receiving the deliverable. Fields within the graphical user interfaces are made visible, modified, and added to reflect the information pertinent to the particular stage in which the deliverable resides. Specification can also be made as to who can edit fields in the life-cycle process, which attachments are visible, and who can edit attachments as the deliverables proceed through the life-cycle. The Marchak system runs on top of a database and an operating system, and provides network interaction.

Marchak defines and distinguishes doers, planners, distributors, and administrators in the life-cycle process. The system does not provide a full cycle, however, where the task workflow remains open until the originator of the task is satisfied that the task is fully completed to definition. Rather, Marchak states that each stage is complete only upon the entry of substantive information required to create the discrete work deliverable. In one such example, a program is included "allowing said appropriate user to indicate that work on the category instance has been completed," leaving off the requirement for the originator to accept the unilateral indication. As specifically described, work flow occurs "when a user checks out a deliverable to work on it" and ends "when a user checks the deliverable back into the system." The originator, meanwhile, is not required to return to the loop.

As a whole, prior workflow techniques fail to provide a truly complete loop of product (or other task) development where a simple, intuitive, graphics-based system coordinates the product (or other task) development through to completion at which time the originator (or proxy) must close the open item. Known workflow systems are either not particularly intuitive (such as custom spreadsheet or database programs), are trackers more than accountability engines (such as schedulers), or fail to provide valid reporting of true productivity (such as systems with only partial life cycle accountability).

BRIEF SUMMARY OF THE INVENTION

The LOP (List of open points) system is a network-based (preferably, Web-based) tracking, planning and reporting tool that addresses day-to-day tasks of the work environment in a simple and easy-to-use interface—and provides complete accountability of progress and effectiveness in completing tasks. The LOP system in its preferred form assists the overall organization in addressing large numbers of tasks and open items in a planned and organized manner. Plus, because of its intuitiveness and widespread availability, the LOP system allows every individual in the organization to access the system so results arise from data obtained by the maximum exposure of the system to the business entity as a whole. With the system, progress tracking, reporting, history review and proper escalation can be achieved in a matter of a few intuitive clicks.

The LOP system includes a database and graphical user interfaces. In its preferred form, the LOP system operates in conjunction with a standard over-the-counter database application operating on a code device communicating with other code devices via a network. On the database is stored a table of fields including a field to assign a unique identification number to each open item, a field to identify a group responsible for the task and an originator of the task, a text field to provide comments regarding the task as it progresses toward completion, and a field to indicate a current status of the task. The status field can include a status item that indicates closure or satisfactory completion of the task. That status should be both restricted for selection only by the originator, and mandatory for the originator to choose (or reject) when the status is regarded as completed by the responsible group.

The LOP system also includes graphical user interface routines to create intuitive, user-friendly graphical user interfaces for completion, modification, and transfer of the open item during its life cycle. Finally, the LOP system includes a notification engine to automatically notify at least one personnel other than the originator when the task is created, at least the originator when the status of the task is altered thereafter, and the originator when the task is identified as completed by the responsible group.

A report facility lets the supervisors view reports identifying timely completion of tasks by responsible group or other such filters. The facility is unique in that the completion information is realistic to the successful, satisfactory completion of the assignment by the customer of the task (indicated by the closure of the open item by the originator and only the originator), rather than by the unilaterally dictated completion of the assignment by the responsible entity.

BRIEF DESCRIPTION OF THE DRAWINGS

FIG. 2 is an example type of graphical user interface for creating new LOP items;

FIG. 4 is an example type of graphical user interface for transferring LOP items;

FIG. 5 is an example type of graphical user interface for delegating an LOP item;

FIG. 6 is an example type of graphical user interface for searching for LOP items;

FIG. 7 is an example type of graphical user interface for reporting on LOP items;

FIG. 9 is an example type of graphical user interface for administering account information;

DETAILED DESCRIPTION OF THE INVENTION

In a sizeable business environment, the task of maintaining, tracking, and documenting the progress of tasks to be performed is complex. Especially in, for example, the manufacturing environment, the identification of new tasks, the assignment, execution, supervision, analysis, completion, and confirmation of those tasks requires substantial personnel resources—just for administrative upkeep. FIGS. 1-12 illustrate several embodiments of so-called LOP (List of open points) systems that more adequately control, track, and report on those open task complexities.

Figure 1:
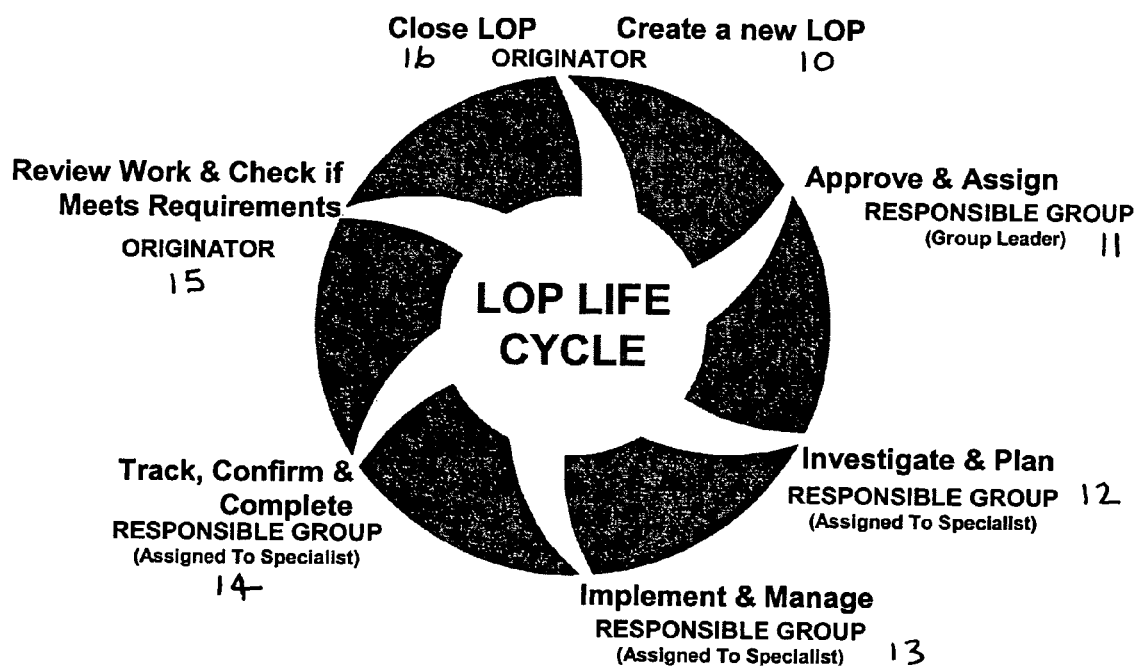
FIG. 1 is a schematic representation of an example embodiment of the LOP life cycle.

The life cycle of an LOP item starts with the originator when a new open point is created. It then proceeds through a series of actions that will eventually result in a closure status for the item. The system of FIG. 1 is simple to use and requires virtually no special training for the originators of tasks or for those responsible for completing them. In every instance, the item returns to the originator at its conclusion to review and technically close if the work is satisfactory.

As shown in FIG. 1, the entire process employed by this embodiment comprises a complete and full circle, beginning and ending with the originator, who creates the task within the business process, passes it through the responsible groups that will complete the task, and closes the task at its satisfactory conclusion. This cycle permits and mandates that the originator remain a part of the solution from beginning to end, and to subjectively determine how and when the open task has been completed appropriately before closure will occur.

The network aspects of the LOP system provide widespread distribution of the system across the business environment so the originator can easily stay in the workflow loop, and more importantly begin and end the workflow cycle.

The workflow cycle of the open point item in FIG. 1 begins when the originator in step 10 creates a new open point (in the LOP system) by entering the open point information into a graphical user interface designed for creation of such (for example, FIG. 2). The new open point can be a new task to be performed, a new manufacturing effort, an administrative detail, and engineering design effort, a sales effort, or any other business process (large or small) that needs to be addressed by a group within the business environment. After its introduction, the cycle proceeds through a series of actions (steps 11 through 15) that eventually results in completion of the task by the responsible group and a return to the originator for review and technical close should the work on the task have proven satisfactory to the originator (at step 16). When the originator 10 creates the new open point, a responsible group is assigned to the task. A group leader of the responsible group (responsible for completing the task) approves and assigns the open point to someone within the group, at step 11. A specialist within the responsible group can also be assigned to the open point to investigate and plan completion, at step 12. The open point is implemented and managed by the specialist in the responsible group at step 13, and is tracked, confirmed, and completed in the responsible group, at step 14. At step 15, the originator returns back into the LOP life cycle loop to review the open point and check if it meets the requirements originally set and/or modified by the originator. If the work completion meets the originator's design, the originator closes the task at step 16. If not, the open point is returned by the originator to the responsible group (or some other group) for further effort.

Figure 12:
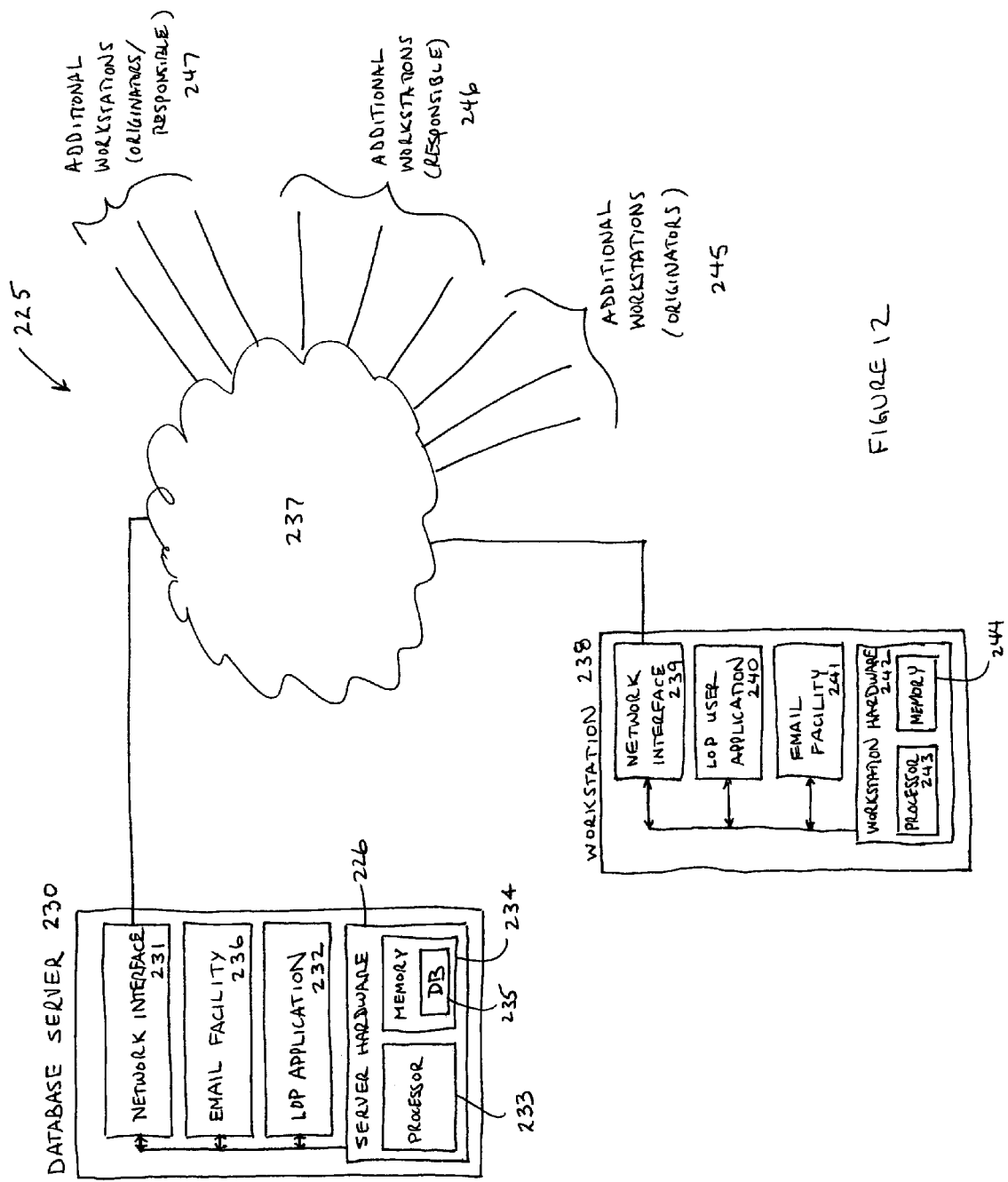
FIG. 12 is a schematic representation of an example system employing aspects an LOP database.

FIG. 12 illustrates one example type of a system in which an LOP system can operate. The system of FIG. 12 provides network access to the user interfaces and database that will be described in more detail below. System 225 is centered on a network 237, which may be the Internet, an intranet, LAN, WAN, wireless network, etc. Workstations 238 (and workstation groups 245, 246, and 247) communicate with each other via the network 237. Workstation 238 is shown by way of example and other workstation types of hardware and software will be known to the artisan. Elements of workstation 238 are also shown by way of example and may be embodied separately (as shown), in combination, in hardware, or in software, as design choice permits.

The example of workstation 238 includes a network interface 239 which may be a standard network card, such as an Ethernet or other communication card, communicating with a network server (not shown), a modem (not shown), or other such device. In the typical embodiment, network interface 239 physically adjoins other workstation hardware 242, such as a motherboard, backplane, or other hardware structure. The hardware structure also includes a processor 243 and memory 244, which respectively process and store the graphical user interfaces and database information described below for display on a workstation monitor. The processor 243 is also associated with a workstation operating system (not shown) that is stored in the memory 244 of the hardware 242. Also included in the workstation 238 is an email facility 241 (such as those commercialized under the names Groupwise, Outlook, etc.). LOP user application 240 provides the software instruction sets necessary for the processor 243 to create the graphical user interfaces, and to communicate with the database server 230.

The invention is not limited to the particular hardware or software structures shown or described with respect to FIGS. 2-12, but may be embodied in a variety of different kinds and types of hardware/software component combinations. The invention can also be embodied solely as a software application. The hardware and software structures shown in FIG. 12 are meant to illustrate general concepts of the inventories and not necessarily the only form in which the invention can be embodied.

Additional workstations may also be included in the system 225, which workstations together with the workstation 238 may form a coherent group of access points for a large number (or all) or a company's relevant employee base. Workstations can be shared by different employee types (such as those who typically operate as work originators versus those who are work responsible) or may dedicated to particular users. Each employee also need not be designated "originator" or "responsible" to the exclusion of the other title, but may (and very likely will) assume originator status for some open items and responsible status for others. Still, in the example of FIG. 12—just by way of illustration—workstations 245 are shown for originators, workstations 246 are shown for responsible entities, and workstations 247 are shown for hybrids.

The database 235 from which all of the information associated with the LOP life cycle can be stored on the individual workstations 238, 245, 246, and 247 in a distributed manner, or may (as shown in FIG. 12) be centralized at a database server 230. The database server 230 also includes a network interface 231 (which can be, but need not be, identical or similar to network interface 239). Server hardware 226 provides a server motherboard or other suitable hardware interface. The hardware can include a processor 233 and memory 234, within which the centralized database 235 is stored. LOP application 232 is included in server 230 and may be stored on memory 234. The LOP application 232 may be software running on a computer code device and may control the creation of GUIs, the communications, and the database interaction. Some aspects of the LOP application 232, as described in the embodiments below may be alternatively embodied within certain database applications that make up the database 235. Email facility 236 provides email capability for the database server to communicate with the corresponding workstations connected to the network 237, as will be described in greater detail below.

The creation of GUIs can be performed by the LOP application 232 or may, preferably, be performed by the LOP application 240 (i.e., locally) based on raw database information received from the server 230. Thus, the functions described herein can be more or less distributed and/or centralized and still encompass the concepts of the invention.

Figure 10:
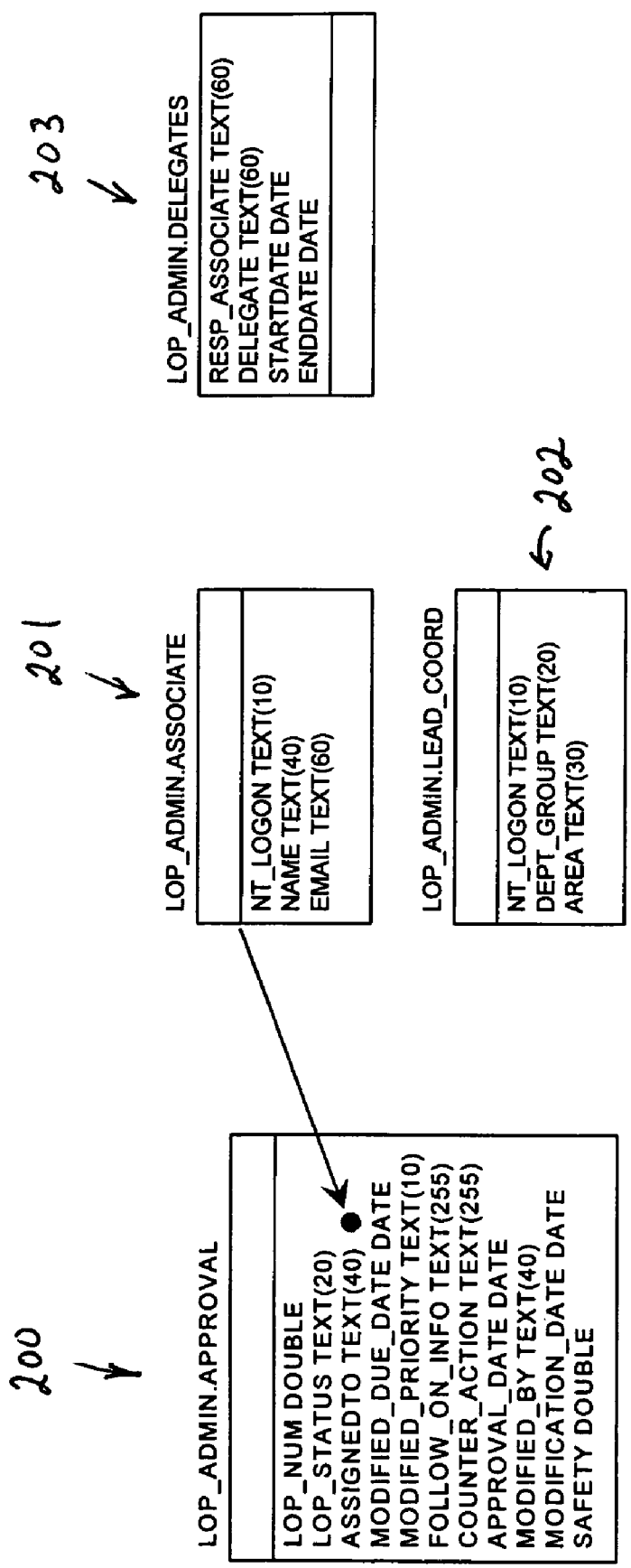
FIG. 10 is a schematic representation of an example LOP database structure.
Figure 11:
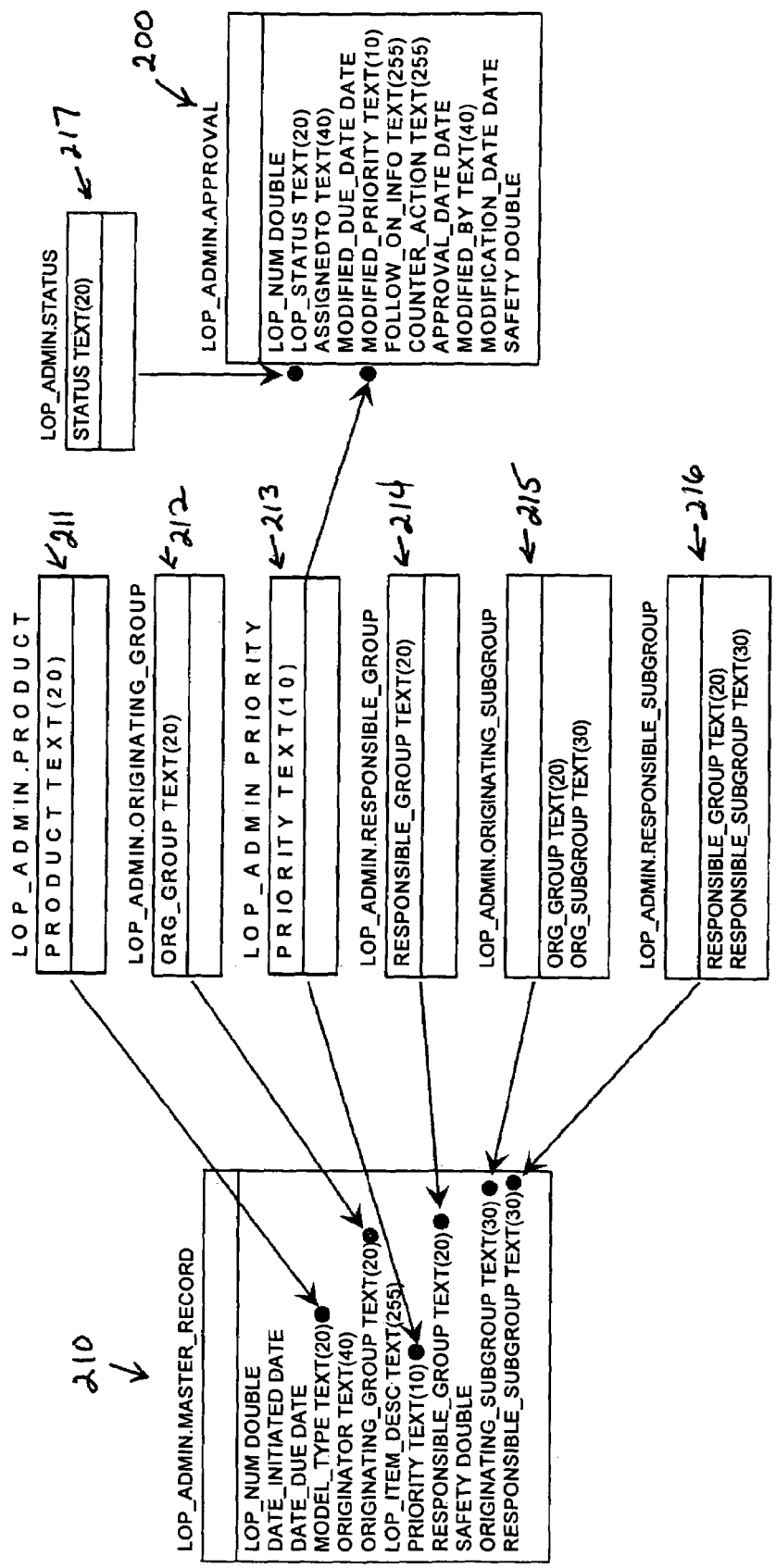
FIG. 11 is a schematic representation of another aspect of an example LOP database structure.

An example of an LOP database 235 is shown in FIGS. 10 and 11. The database need not take the exact form of the tables, variables, and keys described with respect to FIGS. 10 and 11, but may take other suitable forms consistent with the life cycle described. Qualified database designers can, with the teachings contained herein, create other database designs suitable for the present invention, which may include more or less tables and more or less fields. Tables and fields may also take different names and forms and still be within the concepts of the present invention. Thus, FIGS. 10 and 11 provide an excellent example of how the database can be organized to attain the full life cycle objectives.

The structure of the example database comprises three base-level table types, each of which serves a different purpose within the system 225 as a whole. The three database tables types are main database tables, support tables, and administration tables. Each will be described, in turn, below.

The primary purpose of main database tables is to hold all of the entries of the LOP items generated, including current master data and historical master data. Two main database tables are shown in FIGS. 10 and 11, namely LOP_Admin.Approval 200 in FIG. 10 and LOP_Admin.Master_Record 210 in FIG. 11. The LOP_Admin.Master_Record 210 contains a unique record set for every LOP item created in the system. The fields in the table LOP_Admin.Master_Record 210 include:

(1) LOP_Num, which is an automatically generated unique number identifying an LOP action item.
(2) Date_Initiated, which identifies the data a new LOP item is created, and defaults to the system date.
(3) Date_Due, which is a calendar script (such as a Java script calendar) that allows the originator to select a desired due date for a new LOP item.
(4) Model_Type, which is a text field that allows the selection of projects currently running at a company, facility, etc.
(5) originator, which is a test field identifying the name of the person who creates an open point.
(6) Originating_Group, which is a text field identifying the name of a work group that includes the originator.
(7) LOP_Item_Desc, which is a text field used by the originator to describe the type of problem at hand.
(8) Priority, which is a text field to assigned high, medium, or low to the open point.
(9) Responsible_Group, which is a text field selected by the originator to identify the group to which the task is assigned.
(10) Safety, which is a true/false Boolean field to flag those items that are safety related.

(11) Originating_Subgroup, which is a text field identifying a sub-group to which the originator is a part.

(12) Responsible_Subgroup, which is a text field identifying a sub-group to which the task is assigned.

Of those fields, the LOP_Num field is automatically filled by the LOP application 232 in database 235 to provide a unique numerical identifier to each newly created LOP. Other fields, such as the Model_Type, originator, Originating_Group, Priority, Responsible_Group, Originating_Subgroup, and Responsible_Subgroup fields are populated (once the originator makes a selection) either by a support table or an administration table, as described below. Example field character lengths are shown in parenthetical in FIGS. 10 and 11 with respect to each text field.

The LOP_Num field is defined as a non-null, number key within the database 235. Because it is auto-fill in the LOP_Admin.Master_Record table 210, it will always contain a number unique to the particular LOP keyed thereto. The LOP_Num field is the only key field in the LOP_Admin.Master_Record table 210.

In addition, other "generic" fields can be included in the database table to allow customization of the application to the specific needs of the organization. For example, an attachment or link field can be used in this case. If such fields become part of the LOP_Admin.Master_Record table, the same will apply for LOP_Admin.Approval Table.

Once entered, the records in LOP_Admin.Master_Record 210 will await approval, rejection, or a transfer action that will be taken by the appropriate person listed in the LOP_Admin.Lead_Coord (administration table) 202 based on the selected responsible_group and responsible_subgroup fields therein. Once the LOP is approved, rejected or transferred, a record set for that open point is inserted in the LOP_Admin.Approval table 200. Meanwhile, the LOP_Admin.Master_Record table 210 always holds the original data as entered by the originator when the LOP is created.

In the second main database table, the LOP_Admin.Approval table 200 of FIG. 10, the following fields are included:

(1) LOP_Num, which is the same number generated initially in the LOP_Admin.Master_Record Table 210.

(2) LOP_Status, which is a text field holding the latest status of a LOP, such as In Progress, Completed, Closed, Rejected, etc.

(3) AssignedTo, which is a text field containing the name of the person that will be responsible for managing the LOP.

(4) Modified_Due Date, which is a data field containing a due date for which the LOP as modified is then due.

(5) Modified_Priority, which is a text field indicating a modified priority status.

(6) Follow_On_Info, which is a large text field for originators or responsible entities to add messages regarding activity after the LOP origination.

(7) Counter_Action, which is a large text field for entry of textual messages related to counter actions to be performed.

(8) Approval_Date, which is a date field which is not displayed but is a system stamp of time and date.

(9) Modified_By, which is a text field identifying the entity who modified the LOP.

(10) Modification_Date, which is a date field identifying where an LOP was modified.

(11) Safety, which is the same Boolean true/false field used in the master record to flag items that are safety related.

None of the fields in the LOP_Admin.Approval table 200 are auto-fill fields, and all of the fields except the LOP_Num and Safety fields (which come from the corresponding LOP_Admin.Master_Record table 210) are populated by either a support table or an administration table, as will be described with respect to FIGS. 10 and 11.

The LOP_Admin.Approval table 200 contains record sets of every update of an LOP item. While the LOP_Admin.Master_Record table 210 holds the unique original record of each LOP, the LOP_Admin.Approval table holds the history for each of the LOPs that have been modified, approved, transferred, rejected, completed, etc.

The Lop Num field was auto-filled in the LOP_Admin.Master_Record table 210 as a non-null, number key and is simply transferred with the LOP information to the LOP_Admin.Approval table 200 when the LOP is modified, approved, transferred, rejected, completed, etc. The LOP_Status and the AssignedTo fields are variable character fields and are keys. The Modification_Date field is a date field and is a key. The remaining fields in the LOP_Admin.Approval table 200 are not keys.

When an LOP is first created, a record set of the fields shown in table 210 is stored, including LOP number, initiation date, due date, model, originator, originator's group, item description, priority, responsible group, safety rating, originating sub-group and responsible sub-group—all in accordance with the corresponding fields of table 210 shown in FIG. 11. The LOP_Admin.Master_Record table 210 thus contains a unique set of data associated with each LOP ever created.

After modification, approval, rejection, transfer, or other action on the LOP, a record set with the action and the field information shown in FIG. 10 is populated to the LOP_Admin.Approval table fields from either the LOP_Admin.Master_Record table 210 or from support tables. That information corresponding to the those fields will identify the same LOP number from table 200, the status, assignment, modified due date (if any), modified priority rating (if any), follow-on information, counter action, approval date, modifier's identity, modification date, and safety rating. Thus, as the LOP progresses, the LOP_Admin.Approval table 200 records the updated records to reflect the progress. Once the LOP is completed (by the responsible entity) and closed (by the originator), for example, that status will be recorded in the table 200.

Of course, the tables 200 and 210 can be combined into a single table, as can all of the tables being described herein. But, for purposes of modularity and design choice, the example described herein divides the main database tables into two pieces, table 200 and table 210. Other alternatives for combining, dividing, merging, and separating the various tables are to be included within the bounds of this invention.

The second base level table type are the support tables that provide population data for fields of the master tables. Examples are shown in FIG. 11, in which table LOP_Admin.Product table 211 contains a non-null text key field. As shown in FIG. 11, this table populates the Model_Type field of the LOP_Admin.Master_Record table 210 such that a pop-up selection menu of model types 25 (recorded in the LOP_Admin.Product table 211) is provided to the originator when the originator receives the LOP creation graphical user interface of FIG. 2.

LOP_Admin.Originating_Group table 212 contains a non-null text key field. As shown in FIG. 11, this table populates the Originating_Group field of the LOP_Admin.Master_Record table 210 such that a pop-up selection menu of originating groups 26 (recorded in the LOP_

Admin.Originating_Group table 212) is provided to the originator when the originator receives the LOP creation graphical user interface of FIG. 2.

LOP_Admin.Priority table 213 contains a non-null text key field. As shown in FIG. 11, this table populates the Priority field of the LOP_Admin.Master_Record table 210 such that a pop-up selection menu of possible priorities 30 (recorded in the LOP_Admin.Priority table 213) is provided to the originator when the originator receives the LOP creation graphical user interface of FIG. 2. Also, the LOP_Admin.Priority table 213 links to the Modified_Priority field of the LOP_Admin.Approval table 200 where modifications to priorities are recorded. The priority table 213 provides data for a pop-up menu of possible priorities (high, medium, urgent, or other priority characterization).

LOP_Admin.Responsible_Group table 214 contains a non-null text key field. As shown in FIG. 11, this table populates the Responsible_Group field of the LOP_Admin.Master_Record table 210 such that a pop-up selection menu of available responsible groups 31 (recorded in the LOP_Admin.Responsible_Group table 214) is provided to the originator when the originator receives the LOP creation graphical user interface of FIG. 2.

LOP_Admin.Originating_Subgroup table 215 contains two fields: the Originating_Group from table 212 and a corresponding Originating_Subgroup field. Both are non-null text key fields. As shown in FIG. 11, this table populates the Originating_Sub Group field of the LOP_Admin.Master_Record table 210 such that a pop-up selection menu of available originating sub-groups 28 (recorded in the LOP_Admin.Originating_Subgroup table 215) is provided to the originator when the originator receives the LOP creation graphical user interface of FIG. 2.

The LOP_Admin.Responsible_Subgroup table 216, which contains two fields: the Responsible_Group from table 214 and a corresponding Responsible_Subgroup field. Both are non-null text key fields. As shown in FIG. 11, this table populates the Responsible_Subgroup field of the LOP_Admin.Master_Record table 210 such that a pop-up selection menu of available responsible sub-groups 32 (recorded in the LOP_Admin.Responsible_Subgroup table 216) is provided to the originator when the originator receives the LOP creation graphical user interface of FIG. 2.

The final support table shown in FIG. 11 supports only the LOP_Admin.Approval table 200, and is the LOP_Admin.Status table 217. This table 217 contains a non-null text key field identifying status texts. As shown in FIG. 11, this table populates the LOP_Status field of the LOP_Admin.Approval table 200 such that a pop-up selection menu of available status types 55 (recorded in the LOP_Admin.Status table 217) is provided to the user when the user receives the LOP approval/modify graphical user interface of FIG. 3.

In general, the information in LOP_Admin.Master_Record table 210, with its corresponding support tables shown in FIG. 11 supports the corresponding GUI fields in the New LOP Item menu 20 of FIG. 2. The same table 210 also supports the corresponding informational window 21 of FIG. 2 for a newly created LOP item.

Figure 3:
FIG. 3 is an example type of graphical user interface for approving new LOP items.

The information in both LOP_Admin.Master_Record table 210 and LOP_Admin.Approval table 200; with their corresponding support tables shown in FIGS. 10 and 11 support the corresponding GUI fields in the LOP Item Approval menu 39 of FIG. 3. The same tables 200 and 210 also support the corresponding informational window 62 of FIG. 3 for an approved/modified LOP item.

FIG. 10 illustrates the third base level type of table: the administration tables. There, LOP_Admin.Associate table 201 includes information related to the identity, logon, and email address, for all users of the LOP database within the organization. Thus, the table 201 contains three fields, the log-on text field (key), name text field (key), and email address field (key). The information in table 201 is linked to the AssignedTo field of the LOP_Admin.Approval table 200 and is used by the LOP applications 232 and 240 to identify and automatically link (via, for example, email facilities 236 and 241 over network 237) the LOP information to originating and/or responsible entities at the proper time in accordance with the status of the LOP (via changes made to the LOP_Status field).

The LOP_Admin.Lead_Coord table 202 includes information identifying group leaders within the organization. The group leaders identified herein will be the ones assigning, rejecting, or transferring newly created LOP items as necessary. Their log-on, department, and area, are respectively stored in NT_Logon, Dept_Group, and Area text key fields. The LOP_Admin.Lead_Coord table 202 is used mainly as part of the automatic email notification system when LOP items are created. Thus, for example, when an originator creates a new LOP via GUI 20 of FIG. 2, selecting certain Originating Group choices in field 26, Originating Sub Group choices in field 28, Responsible Group choices in field 31, and Responsible Sub Group choices in field 32 will prompt automatic email notifications to one or more corresponding group leaders for approval, rejection, modification, etc. Those group leaders' personal information for the email facility 236 to employ for the notification are located in LOP_Admin.Lead_Coord table (with further reference to the corresponding NT_Logon and Email fields of the same person, as identified in LOP_Admin.Associate table). When a group leader is not available, or for backup purposes, one or more proxies or delegates (or other hierarchical assignments) for each group leader can be automatically stored (and automatically emailed) via the LOP_Admin.Delegates table 203. That table has four non-null key fields, identifying (from top to bottom of table 203 in FIG. 10), the name of an associate, name of a delegate, start, and stop dates (for active proxy periods).

The operation of the databases of FIGS. 10 and 11 will now be described, with particular reference to the graphical user interfaces of FIGS. 2-9. An originator of an open point uses workstation 238 to contact the database server 230 via the network 237. LOP User Application 240, operating on the workstation hardware coordinates the interaction with its counterpart LOP application 232 at server 230. A graphical user interface shell is provided (preferably by LOP application 240 to reduce bandwidth requirements of sending video information over the network 237, but alternatively by the LOP application 232) for the originator to interact with the LOP application 232 of the database server 230, to load the new open point information into the database 235. That shell can be seen in FIG. 2, where the substantive information in the various field entries is removed.

GUI 20 in FIG. 2 is headed by a title "New LOP Item" 22 or other suitable title informing the originator that the screen is particularly purposed for the loading of new LOP information into the database 235. Ultimately, when the shell is filled by the originator with field information (an example of which is shown in FIG. 2 and will be described below), the originator clicks the "Submit" key 33 and the information in the fields is loaded into the corresponding fields of the LOP_Admin.Master_Report table 210 (FIG. 11) in the database 235. Once the originator's new LOP information is stored in the LOP_Admin.Master_Report table 210, it remains, unchanged.

The fields in the GUI 20 correspond with some of the fields described previously with respect to the database tables of FIGS. 10 and 11. The GUI 20 includes a header 22 identifying the screen as a new LOP entry screen.

Date window 23 accepts the entry of a current date when the originator creates the new open point alternatively, date window 23 can automatically enter a current date. The date entered in the date window 23 is loaded into the Date_Initiated field in table 210 (FIG. 11) when the originator clicks the "submit" button 33.

The originator window 24 (FIG. 2) identifies the person originating the new open point and loads into the originator field in table 210 (FIG. 11). The arrow in window 24 initiates the drop down menu of possible solutions from table 201.

The Model window 25 identifies, for example, a product model. A drop down menu in the Model window 25 draws information from the LOP_Amin.Product field of table 211, such that a list of all models in the table 211 can be seen and selected by the originator creating the new open point. The Model window 25 loads into the Model_Type field of table 210.

The Originating Group window 26 identifies the originator's work group. A drop down menu in the Originating Group window 26 draws information from the LOP_Amin.Originating_Group field of table 212, such that a list of all groups in the table 212 can be seen and selected by the originator creating the new open point. The Originating Group window 26 loads into the Originating_Group field of table 210.

The Originating Subgroup window 28 identifies the originator's work subgroup. A drop down menu in the Originating Subgroup window 28 draws information from the LOP_Amin.Originating_Subgroup field of table 215, such that a list of all groups in the table 215 can be seen and selected by the originator creating the new open point. The Originating Subgroup window 26 loads into the Originating_Subgroup field of table 210.

The Responsible Group window 31 identifies the group that originator assigns to be responsible for the open point. A drop down menu in the Responsible Group window 31 draws information from the LOP_Amin.Responsible_Group field of table 214, such that a list of all groups in the table 214 can be seen and selected by the originator creating the new open point. The Responsible Group window 31 loads into the Responsible_Group field of table 210.

The Responsible Subgroup window 32 identifies the originator's work subgroup. A drop down menu in the Responsible Subgroup window 32 draws information from the LOP_Amin.Responsible_Subgroup field of table 216, such that a list of all groups in the table 216 can be seen and selected by the originator creating the new open point. The Responsible Subgroup window 31 loads into the Responsible_Subgroup field of table 210.

The Due Date window 27 allows the originator to set a due date for completion of the open point by the responsible group. A calendar script is provided with window 27 to run a calendar with selectable dates that can be automatically loaded into the window 27. The Due Date window 27 loads into the Date_Due field of table 210.

Finally, the GUI 20 includes a Description window where the originator can provide a text message to the responsible group related to the newly created open point. The description is loaded into the LOP_ITEM_DESC field in table 210.

Once the information is provided into the various windows of the GUI 20, the originator clicks the "submit" button 33 and the LOP application 232 then takes over with some of the automated procedures associated with this preferred embodiment. Specifically, the LOP application 240 at the workstation 238 prepares the field information into a format that is both transferable to the database server 230 (via appropriate transportation protocol conversions provided by the network interface 239, network 237, and network interface 231) and understandable to the LOP application 232. The LOP application 232 at the database server 230 loads the current date, model, originator, and other information into the corresponding fields identified above of the table LOP_Admin.Master_Record 210. That information is communicated by the LOP application 232 to the server hardware 226 for storage in the database 235.

The LOP application 232 then queries the database 235, specifically the LOP_Num field, to determine a next available unique number to be assigned to open points. The LOP application 232 then automatically fills in the LOP_Num field of table 210 by recording the next available unique number, which will be permanently assigned to that particular open point through its life cycle (FIG. 1).

The LOP application then prepares the submitted information chart 21 (FIG. 2) and communicates the summary chart to the email facility 236 of the database server 230 (the email facility may in alternative embodiments interact with a separate email server). The LOP application then reads the Originator field, Originating_Group field, Responsible_Group field, and Responsible_Subgroup field from table 210 (or from the information communicated from the workstation 238 as previously entered in GUI 20). The LOP application then looks up the originator, group leaders, delegates, and associates from the LOP_Admin.Associate table 201 and the LOP_Admin.Delegates table 203 to locate identities and email addresses for them. The submitted information chart 21 is then communicated by email to the originator, Responsible Group leader, and Responsible Subgroup leader via the email facility 236, network interface 231, and network 237 to the respective workstations (for example, 244-247) associated with those people.

The LOP life cycle of FIG. 1 thus begins at step 10 when the originator completes the GUI 20 fill-in for that particular new open point. After step 10, the application 232 coordinates the communication of the chart 21 to the various entities described above. Also, the approval GUI 39 (FIG. 3) is then communicated to the group leader of the Responsible Group identified in fields 31/32 (FIG. 2) and LOP_Admin. Lead_Coord table 202 (FIG. 10). The approval GUI 39 can be called up by the group leader when the group leader automatically receives the chart 21 via the email process identified above, or preferably, the approval GUI 39 is generated by one or both of the LOP application 232 and LOP application 240 (for the particular workstation 238/246/etc. being utilized by the group leader) for retrieval as an automatic attachment to email notice with the chart 21. In still another embodiment, the group leader can search for open items via the LOP item tracking search tool 42 that pulls up the open item status information (for example, some or all of windows 43-60) for review, approval, or assignment by the group leader.

Once the group leader receives the approval chart 39, the life cycle reaches step 11 where the group leader approves and assigns the open item in the approval GUI 39. The approval GUI 39 presents the group leader with certain information regarding the open item, including the tracking number 43 copied from the LOP_Num field of the LOP_Admin.Approval table 200. The date the open item was initiated is shown in Date Initiated window 44, which is copied from the Date_Initiated field of table 210. So too, the Due Date window 46, Model window 49, originator window 45, Originating Group window 47, Originating Subgroup window 48, Description window 50, Priority window 51, Responsible Group window 53, and Responsible Subgroup window 54 are filled in from their corresponding fields in tables 210 and 200 (see, for example, the same corresponding fields and their window correlations described above with respect to FIG. 2).

The Status field 52 is loaded from the LOP_Status field of table 200. Note that the status field is not a field in the creation GUI 20, nor of the LOP_Admin.Master_Record table because the status of all such newly created open items is set to "Not assigned" (or similar) once the open item is created (at step 10) but not yet approved (at step 11). Thus, the status field 52 in FIG. 3 for the newly created LOP item number "6013" is "Not assigned" in the condition that the group leader would see for the information in the approval GUI 39 of FIG. 3.

That status is changed when the group leader approves and assigns the open item. In the approval step 11, the group leader enters information in windows 55-60 to approve the open item for work, and to assign it to a specialist within the group. First, the status window 55 is changed (via the pull down menu of possible status conditions) to reflect the status of the open item following the group leader's action. If the open item is rejected, then the status is indicated as such, and an automatic email notification will be sent to the originator for the originator to either modify the open item, reassign it, or affirmatively close it in the LOP loop in FIG. 1. If instead the group leader assigns the item, the status is changed to "In Progress" (or similar), which status replaces the LOP_Status field in table 200 when the group leader clicks the "Submit" button 61.

Other windows entered by the group leader include the "AssignedTo" window 56 that loads the AssignTo field of table 200. A pull down menu on button 56 provides a listing from the table 201 for possible assignees within the corporate structure. The group leader can also modify the priority set by the originator in Modified Priority window 57. Note that a change in the priority entered by the group leader has no impact on the Priority field in the table 210 associated with the original priority designation entered by the originator. The Modified Priority window loads the Modified_Priority field in table 200. A pull down menu on button 57 permits the group leader to choose from various priority candidates. The group leader can modify the Due Date by entering a new due date in the window 58. The calendar script can also be called up to assist in selecting the modified due date, by the associated calendar button on window 58. The modified due date is loaded into the Modified_Due_Date field of table 200.

The group leader can then enter textual information into the Preparation text box 59 to inform the specialist of specific preparations that the group leader believes necessary. The information is loaded into the Follow_On field of the table 200. Finally, activity associated with the open item as it is being assigned, approved, rejected, performed, completed, etc. can be entered in the activity box 60, which is loaded into the Counter_action field of table 200.

The new information in the windows of FIG. 3 are loaded into the corresponding fields of table 200 when the submit button 61 is clicked. Other fields in the table 200 are automatically entered when the group leader makes the submission. For example, the identity of the group leader who made the submission is recorded in the Modified_By field of table 200. The date that the group leader submitted the approval or assignment is automatically recorded in the Modification_Date field of table 200.

A chart 62 then reports the modifications made to the LOP open item, which chart is automatically emailed to the specialists to whom the group leader assigned the open item and (optionally) to the originator. The email notifications are automatically created and sent with the open item information via the LOP application 240 and email facility 241 working in conjunction with the network interface 239 and network 237. Alternatively, all email notifications can be conducted from a centralized location, such as the email facility 236, depending upon the design choice of a more centralized versus more distributed architecture desired.

Once the new open item is created (step 10), and approved (step 11), the specialist receives the email notification of the new open item and begins investigating and planning the open item completion in step 12. Steps taken and progress made can be reported in the GUI 39, which when submitted can produce automatic email reports and further recordations in Table 200. The open item is then implemented and managed in the group, at step 13. The progress can be tracked via search tools described belong, and can be confirmed and completed, at step 14. As the LOP open item gains a new such status, the LOP_Status field of table 200 gets continually updated. When the status becomes "complete," then the LOP application 240 automatically generates an email report to the originator at step 15. The open item becomes "closed" in status only when the originator makes it so closed. For any given LOP number (i.e., open item), the closed status can be omitted from the pull-down menu for all users except the originator. The LOP life cycle is a completely closed loop system in that the originator of the open item is required and prompted to affirmatively close the open item (at step 16) before the item is truly completed.

FIG. 4 illustrates an LOP item transfer GUI 70. The LOP tracking number 72 (from the LOP_NUM field of table 210 (as shown in window 72). Window 72 also includes a find button for locating the information associated with a particular LOP number entered in the LOP window 72. When an LOP number is entered and the find button clicked, the information associated with the particular opened item, as recorded in the tables 200 and 210 as displayed in the elements 43-54, corresponding to like numbered elements in FIG. 3.

The GUI 70 is particularly associated with an open item transfer from one responsible group or responsible subgroup to another. The header 71 indicates that the GUI 70 is an "LOP item transfer" to facilitate the transfer of responsibility for an open item from one entity to another. The responsible group to which the open item is transferred is entered in window 77 via the pull-down menu associated with window 77. If a new responsible sub-group is being assigned, the responsible sub-group is entered into window 72 via the associated pull-down menu. Use of the responsible group window 77 and responsible sub-group window 72 are similar to a use of the responsible group and responsible sub-group windows 31 and 32 of FIG. 2. When modifications are made to the responsible group via the transfer windows 77 and 72, the data entries in the associated Responsible_Group field and Responsible_Sub-group field of table 210 are modified accordingly. At the time of transfer, new activity information can be entered into the activity window 73, similarly to the information entered in the activity window 60 of GUI 39.

When the submit button 74 is clicked, the information and the responsible group window 77 and responsible sub-group window 72 are transferred to the corresponding fields in table 210 of data base 235. The activity window information 73 is supplemented to the Counter_Action field of table 200 in the data base 235. When the submit button is clicked 74, the email facility 236, together with LOP application 232 provides appropriate email notifications to the group leaders of the responsible group and responsible sub-group for email notifications of the chart information and GUI 39 of FIG. 3. When a transfer of an LOP takes place, and in order to preserve the history of the original LOP item, a new LOP is created and assigned to the task while the original LOP will take on a status of TRANSFERRED and will no longer become active.

FIG. 5 illustrates a GUI 80 for delegation of group leader responsibilities. The header 81 of "LOP delegate" indicates the GUI is intended for delegating responsibility for group leader approval/assignment to another person. In GUI 80, window 82 provides a responsible associate and window 83 provides a delegate associate. The windows 82 and 83 have pull-down menus from which the employee information of table 201 and 202 can be provided for the selection of responsible associates and delegate associates. Window 84 provides a start date during which the proxy process is available from the group leader to the responsible associate or delegate associate and window 85 provides a concluding date for that proxy. When the group leader clicks the submit button 86, the information in windows 82-85 are written to the corresponding fields of table 203 in data base 235. Again, the LOP application 232 in combination with the email facility 236 can provide notifications to the chosen responsible associate and chosen delegate associate indicating their responsibility during the proxy period.

After a responsible associate and delegate associate are selected in windows 82 and 83 for a group leader, LOP approval GUI 39 (FIG. 3) will be received by the responsible associate and/or the delegate associate identified in windows 82 and 83 for that particular group leader during the proxy period. Responsibility for completing the approval process in the GUI 39 then falls upon the responsible associate 82 and/or the delegate associate 83 in lieu of the group leader during the proxy time identified in windows 84 and 85. The LOP application 232 automatically adds the LOP delegate information from table 203 for the particular group leader whenever a new open item is identified for the group leader, such that the responsible associate 82 and delegate associate 83 will automatically received the same email notifications provides to the group leader, as identified above, in lieu of, or in addition to the group leader during the proxy period. Upon reaching the end date of the delegate assignment, the authorization granted during the proxy period will be automatically revoked.

As shown in FIG. 1, the LOP life cycle also provides the opportunity to track open items in step 14. One example method by which that tracking can occur is shown in FIG. 6. There, GUI 90, with header 91 of "LOP item search" allows all (or specified) users to track open items by LOP tracking number. The LOP tracking numbers entered in window 92, followed by a click on the search button of window 92. The result causes the LOP application 232 to call the LOP information from the data base 235 and create the information necessary for the LOP user application 240 of the work station 238 to create the LOP information GUI 106 via step 104. The LOP information GUI 106 includes two sections, section 107 with the original LOP item information from table 210 and modified LOP item information section 108 reporting the modification and status information for the open item from table 200. A detailed description of each of the fields shown in sections 107 and 108 of GUI 106 will not be repeated here, as the corresponding sections have been described previously with respect to FIGS. 2-5.

Alternatively, the LOP item search GUI 90 provides the opportunity to search by a variety of filters (rather than by LOP tracking number, which may not be known). In window 93, model number filters can be applied to sort LOP items applicable to some or all model types. LOP open items created by an originator can be filtered in window 94, as can originating groups and filter window 95. Responsible groups can be filtered in filter window 96. Originating sub-groups and responsible sub-groups can be filtered via filter windows 102 and 103, respectively. In the entity filters 94, 95, 96, 102, and 103, a user of the GUI 90 can identify open items for particular people and/or groups and/or combinations of such, such that personal responsibility can be assessed with respect to classes of LOP items.

LOPs can be filtered by current priorities in current priority filter 97. In this filter, all LOP items, for example, that are high priority can be displayed. Similarly, the current status filter in window 98 can filter LOP open items according to their current status, as reflected in the LOP___status field of table 200. In this manner, LOP items which are in progress, completed, ready for approval, etc. can be identified.

LOP items can also be filtered by due date in due date filter 99, which will provide LOP open items due prior to the dates specified. Finally, filters are provided for LOP items with AssignedTo field identifiers in window 100. Key word searches can be performed on LOP open items in window 101.

One or more of the filters 93-103 can be applied singularly or in any combination of one or more. When the "search" button is clicked, step 105 provides the results of the various filters set in windows 93-103 to provide the report 109. The report 109 provides the LOP open items corresponding to the search criteria provided in windows 93-103 and include a header portion 110 identifying a key associated with the various entries 111 identified by the results of the search.

LOP item searches via GUI 90 can be performed by any of the employees in the system 225 (FIG. 12) in order to identify open items according to various criteria, such as the ones to which they are responsible, the ones to which their group are responsible, the highest priority items, the ones which are recently due, etc. Alternatively, access restrictions can be mandated for various employees or class of employees.

FIG. 7 illustrates an LOP adherence report 120, which can be provided as an administrative follow-up report for all LOP activity. The LOP adherence report provides an itemization of LOP items that are in progress and past due, as an indicator of efficiency with respect to the history of open item activity. Search criteria for the information is provided in fields 121 (model), 122 (originating group), 123 (responsible group), 124 (responsible sub-group), 125 (current priority), 126 (AssignedTo) such that the categorization of the adherence report can be tailored to the specific desires of the administrator. A help button 127 is also provided for assistance in preparing and understanding the adherence report.

The results of an adherence report according the fields entered in windows 121-126 include a quantitative analysis 128 reporting the responsible group 129, the on-time percentage 130, a set of overdue aged reportings 131, a number of closed items performed by the responsible group 129, and an LOP adherence percentage 133. The responsible group numbers are totaled in line 134. A summary of the information 135 is also provided to indicate for the various search criteria the number of open items by assigned, in progress, completed, rejected, and transferred for a total LOP item report. The information contained in the report 120 can be provided to administrative personnel for the purpose of evaluating efficiencies of various responsible groups as the open items are processed through the system 225. Because the status field in the data base 235 associated with each LOP item is tracked in accordance with the time statuses are changed and the due date reported for that LOP item, on-time activity (and overdue activity) can be reported in the report 120 via the LOP application 232.

Figure 8:
FIG. 8 is an example type of graphical user interface for reporting on LOP assignment response times.

FIG. 8 illustrates a report LOP assignment response time 136. A header 137 identifies the report and fields 150-157 identify report criteria including the model 150, originating group 151, responsible group 152, responsible sub-group 153, current priority 154, period 155, status 156, and the assigned to entity 157. Information for the criteria identified in the fields 150-157 is reported with respect to the ability to respond on time, or overdue on particular LOPs. The information is reported in section 158 of the report 136 in which the responsible group is identified in section 159, the total open items presented to the responsible group is identified in section 160, the LOPs that were assigned on time to the responsible group identified in section 161, the percentage of LOPs assigned on time identified in section 162, the LOPs assigned too late identified in section 163, the percentage of LOPs assigned too late identified in section 164, and the average assigned time identified in section 165, totals for the entire section of responsible groups identified in section 158 is identified in line 166.

FIG. 9 illustrates an associate information GUI 170 in which an administration screen 169 provides an add, modify, delete associate account information selection to provide the GUI 170. GUI 170 includes a header 171 identifying the form as one to enter, modify, or delete associate information. The GUI 170 loads the table 201 of FIG. 10. In GUI 170, the associate's name is entered in window 172. Associates can be searched using search button 173, or the new associate information can be entered in section 174 and the "add" button of section 175 clicked to record the information in table 201. In any event, the associate information is entered/modified in section 174, the network log in for that associate is entered into section 174, and the email address for that associate is entered in section 174. The information entered in GUI 170 is used by the email facility 236 for purposes of communicating the various automatic email notifications.

As can be seen from the above description, various alternative kinds of data base structures can be envisioned within the scope of the present invention, and the present invention is not limited to the particular data base fields, structures, or hardwares described in the above preferred embodiment. Rather, LOP life cycle data bases in which an originator creates a new item, which item is not completed until a fully closed loop ends with the originator affirmatively closing the item can be envisioned within the present system. The present embodiment provides substantial functionality in improvements over "spreadsheet" systems, and other primitive data base systems in which tasks are assigned in the workflow, but are lost, misreported, or abandoned without follow-up.

In an alternative embodiment, the administrative options shown in FIG. 9, section 169 are limited depending upon the identity of the user. Thus, users with higher levels of responsibility may have higher levels of administration and reporting options, while employees of relatively lower responsibility (or such other classifications as are appropriate) have fewer administration and reporting options available to them. In this way, access to administrative functions can be limited such that, for example, an originator of an LOP item can be the only person with the administrative capability of closing an LOP item. In a more macroscopic sense, some users may be prevented entirely from accessing various GUIs, such as new open item creation GUI 20, approval GUI 39, etc.

The present system provides clear ease of use and is highly intuitive. The system is intranet-based such that communication between the various originators, responsible groups, specialists, etc. is easy and intuitive. A full cycle between the originator and the responsible entities is provided such that a mandated, complete and closed loop process returns the open item back to the originator—utilizing automatic email notifications—before the open item is officially closed. This means that the customers is always a part of the solution and has the final say as to whether an item has been completed or not. Detailed reporting techniques provide proper escalation procedures as needed, as LOP items are completed or become overdue. Further, history tracking provides documents information regarding the quantitative history of various entities' ability to complete open items on time.

In its broadest form, the system is highly useful as a "corrective action system." One such system was the well-recognized 8-Discipline problem solving technique described by the Ford Motor Company. Under that system—which is being implemented throughout manufacturing corporate communities—the "eight disciplines" include Use Team Approach, Describe the Problem, Implement and Verify Short-Term Corrective Actions, Define end Verify Root Causes, Verify Corrective Actions, Implement Permanent Corrective Actions, Prevent Recurrence, and Congratulate Your Team. As described, three of the eight disciplines specifically address corrective actions to which the LOP system has particular application (and hence indirect application to all eight disciplines). The invention is not limited to the 8-D approach nor to application with such an approach, but is applicable to corporate problem-solving, and productivity issues in general.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A computer system with a database application operating on a computer and communicating with other computers via a network, comprising:

a database server interacting with the other computers via the network, said database server including a processor and a memory device for storing database data containing a table of fields, including:

a task identification field to provide a unique item identification associated with an open item;

personnel identification fields to identify personnel involved in the task, inchxiing at least an originator of the task;

a text field to provide comments regarding the task; and a status field to indicate a current status of the task, said status field including a status indicating closure of the task, said closure status being access restricted to said personnel other than the originator;

a graphical user interface routine which when invoked on one of the other computers creates a graphical user interface on that other computer, and the graphical user interface including interface window data corresponding to the task identification, personnel identification, text, and status fields in the table; and the computer system further including processors at the other computers with at least the processor at the database server or at one of the other computers invoking a notification engine to automatically notify at least one personnel other than the originator when the task is created and at least the originator when the status of the task is altered thereafter and wherein said computer system mandates that the originator is the only one authorized to close and end a task, a data receiving routine which when invoked by the computer system records information from task originators reflecting newly entered business tasks; and a data compilation routine which when invoked by the computer system coordinates preparation of data tables including:

(a) a task table comprising unique identifiers for newly opened business tasks recorded into the data receiving routine, the task table keying each unique identifier to at least three fields comprising:
an identification of an associated task originator,
an identification of a responsible group performing the newly opened business tasks, and
a textual description of the newly opened business tasks; and (b) a history table also with the same unique identifiers corresponding to the newly opened business tasks, the history table keying each unique identifier to at least two fields including the status field, and a textual description of actions taken with respect to a task;

wherein the status field is modification-precluded for said responsible group.

2. A computer system with a database application operating on a computer and communicating with other cpmputers via a network, comprising:

a database server interacting with the other computers via the network, said database server including a processor and a memory device for storing database data containing a table of fields, including:
a task identification field to provide a unique item identification associated with an open item;
personnel identification fields to identify personnel involved in the task, including at least an originator of the task;
a text field to provide comments regarding the task; and
a status field to indicate a current status of the task; said status field including a status indicating closure of the task, said closure status being access restricted to said personnel other than the originator;

a graphical user interface routine which when invoked on one of the other computers creates a graphical user interface on that other computer, and the graphical user interface including interface window data corresponding to the task identification, personnel identification, text, and status fields in the table; and the computer system further including processors at the other computers with at least the processor at the database server or at one of the other computers invoking a notification engine to automatically notify at least one personnel other than the originator when the task is created and at least the originator when the status of the task is altered thereafter and wherein said computer system mandates that the originator is the only one authorized to close and end a task, wherein the notification engine further notifies the originator when the status of the task is moved to a provisional completion status by personnel, other than the originator, and wherein the computer system thereafter mandates that the originator select either the closure status or another status, and wherein when any status other than the closure status is selected, the notification engine further notifies at least one of the personnel other than the originator that the status of the task has been rejected for closure.

3. The computer system according to claim 2, further including: a report engine providing reports identifying a rate at which personnel were identified by the personnel identification fields on tasks that received a timely closure status by the originator.

4. The computer system according to claim 2 further including a feedback software routine to prompt the task originators to approve and close business tasks that they had originated.

5. The computer system according to claim 2 wherein the status field is modification-enabled only to the originator and system administrators.

6. The computer system according to claim 2 further including a network access software routine to interface the data receiving system with a network.

7. A computer controlled system and network application to process tasks through a business environment via a network, the network application operating in conjunction with a database application on a computer database within the computer system, comprising:

a database interface to coordinate generation of a database table having relational fields including:
a unique task identifier field to containing a database-defined unique identifier for each new task entered into the database that is unique from all other identifiers of all other tasks;
an originator field containing a unique identifier of an originator of said task;
a statement of task field to contain a textual statement corresponding to said task; and
a responsible entity field to contain a unique idefitifier for an entity responsible for said task; said unique task identifier field keyed to said originator field, said statement of task field, and said responsible entity field;

a module, when invoked by the computer system, which interfaces selected database information to the network; and the computer system further including at least one processor invoking a notification engine to automatically create a notification to the responsible entity via the module and the network of the creation of a task keyed to the responsible entity in the responsible entity field, and to automatically create a notification to the originator via the module and the computer controlled network of the completion of the task by the responsible entity, and wherein only the originator is authorized to close and end a task, wherein the notification engine creates: (1) a first graphical user interface automatically created and communicated to the supervisor via the module whenever an originator creates a new task, said first graphical user interface including said relational fields corresponding to the new task and tools, to approve, modify, or reject the new task; (2) unless the supervisor rejects the new task, a second graphical user interface automatically created and communicated to the entity responsible for the new task via the module, said secoud graphical user interface including said relational fields corresponding to the new task and tools to report on status and progress of said new task; (3) a third graphical user interface automatically created and communicated to a supervisor of the originating subgroup via the software module, said third graphical user interface including said relational fields corresponding to the new task and tools to approve, modify, or reject the new task; and (4) a fourth graphical user interface automatically created and communicated to the responsible subgroup via the software module, said fourth graphical user interface further including said relational fields corresponding to the new task and tools to report on a status and progress of said new task, wherein the database table further includes a responsible subgroup identification field and an originating subgroup identification field to identify, respectively, a subgroup within the workgroup including the originator.

8. The computer controlled system according claim 7, further including a search engine tied to the database table to provide searchable entries for currently open tasks, for a given originator.

9. The computer controlled system according to claim 7, wherein the originator field further includes:
an originator group field automatically identifying, based on said originator field, a
supervisor of a workgroup including the originator of said task; the database table further including:
a statement of task field to contain a textual statement corresponding to said task; and
a responsible entity field to contain a unique identifier for an entity responsible for said task;
said unique task identifier field keyed to said originator field, said statement of task field,
and said responsible entity field.

10. The computer controlled system according to claim 7 wherein the computer database further includes a second table containing administrative information to automatically populate the originator field, originator group field, and responsible entity field based on predefined selection options.

11. The computer controlled system according to claim 7 wherein:
the database table further includes a priority field to identify a priority level of said task,
and a due date field to identify a due data associated with the task; and
wherein the notification engine further provides an automatic email notification to the originator at a set time relative to the due date.

12. A computer controlled system and network application to process tasks through a business environment via a network, the network application operating in conjunction with a database application on a computer database within the computer system, comprising:
a database interface to coordinate generation of a database table having relational fields including:
a unique task identifier field to containing a database-defiled unique identifier for each new task entered into the database that is unique from all other identifiers of all other tasks;
an originator field containing a unique identifier of an originator of said task;
a statement of task field to contain a textual statement corresponding to said task; and
a responsible entity field to contain a unique identifier for an entity responsible for said task; said unique task identifier field keyed to said originator field, said statement of task field, and said responsible entity field;
a module, when invoked by the computer system, which interfaces selected database information to the computer controlled network; and
the computer system further including at least one processor invoking a notification engine to automatically create a notification to the responsible entity via the module and the network of the creation of a task keyed to the responsible entity in the responsible entity field, and to automatically create a notification to the originator via the module and the computer controlled network of the completion of the task by the responsibe entity, and wherein only the originator is authorized to close and end a task, wherein the notification engine automatically notifies the supervisors via a first graphical user interface, which notification is communicated to the supervisor whenever an originator creates a new task, said first graphical user interface including said relational fields corresponding to the new task and tools to approve, modify, or reject the new task, and, unless the supervisor rejects the new task, notifying the entity responsible for the new task via a second graphical user interface automatically created and communicated to the entity responsible for the new task, said second graphical user interface including said relational fields corresponding to the new task and tools to report on status and progress of said new task.

13. The computer controlled system according to claim 12 wherein the computer database further includes a second table containing administrative information to automatically populate the origirtator field, originator group field, and responsible entity field based on predefined selection options.

14. The computer controlled system according to claim 12 wherein:
the computer database further includes a priority field to identify a priority level of said task, and a due date field to identify a due data associated with the task; and
wherein the notification engine further provides an automatic email notification to the originator at a set time relative to the due date.

15. The computer controlled system according to claim 12 wherein the computer database further includes a responsible subgroup identification field and an originating subgroup identification field to identify, respectively, a subgroup within the workgroup including the originator.

16. The computer controlled system according to claim 15 wherein the notification engine further creates a third graphical user interface automatically created and communicated to a supervisor of the originating subgroup via the software module, said third graphical user interface including said relational fields corresponding to the new task and tools to approve, modify, or reject the new task; and a fourth graphical user interface automatically created and commumnicated to the responsible subgroup via the software module, said fourth graphical user interface further including said relational fields corresponding to the new task and tools to report on a status and progress of said new task.

* * * * *